(12) United States Patent
Makled et al.

(10) Patent No.: US 10,089,869 B1
(45) Date of Patent: Oct. 2, 2018

(54) TRACKING HIT AND RUN PERPETRATORS USING V2X COMMUNICATION

(71) Applicant: Ford Global Technologies, LLC, Dearborn, MI (US)

(72) Inventors: Daniel A. Makled, Dearborn, MI (US); Michael McQuillen, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/605,551

(22) Filed: May 25, 2017

(51) Int. Cl.
| | |
|---|---|
| B60Q 1/00 | (2006.01) |
| G08G 1/017 | (2006.01) |
| G08G 1/09 | (2006.01) |
| H04L 29/08 | (2006.01) |
| H04W 4/00 | (2018.01) |
| H04W 4/80 | (2018.01) |

(52) U.S. Cl.
CPC ........... *G08G 1/0175* (2013.01); *G08G 1/091* (2013.01); *H04L 67/12* (2013.01); *H04W 4/008* (2013.01); *H04W 4/80* (2018.02)

(58) Field of Classification Search
CPC ........ B60R 25/00; B60R 25/04; G08G 1/127; G08G 1/162; G08G 1/096716; G08B 13/19647; G07C 5/008; H04N 2/181; H04N 2/18
USPC ................... 340/539.13, 436, 989, 935, 905; 348/148; 705/305, 14.66; 701/1, 33.4, 701/36
See application file for complete search history.

(56) References Cited

U.S. PATENT DOCUMENTS

| | | | | |
|---|---|---|---|---|
| 6,246,323 | B1 * | 6/2001 | Fischbach | B60R 25/00 340/539.13 |
| 7,069,118 | B2 * | 6/2006 | Coletrane | G07C 5/008 340/436 |
| 9,102,261 | B2 * | 8/2015 | Chang | B60Q 9/00 |
| 9,508,201 | B2 * | 11/2016 | Bhogal | G07C 5/008 |
| 2001/0006373 | A1 * | 7/2001 | Jeong | G08G 1/127 342/357.31 |
| 2006/0033615 | A1 * | 2/2006 | Nou | G08B 13/19647 340/539.13 |

(Continued)

FOREIGN PATENT DOCUMENTS

| | | |
|---|---|---|
| CN | 104091441 A | 10/2014 |
| JP | 2013023100 A | 2/2013 |

(Continued)

OTHER PUBLICATIONS

Frank Perry, *Overview of DSRC Messages and Performance Requirements*, May 3, 2017, retrieved from https://www.transportation.institute.ufl.edu/wp-content/uploads/2017/04/HNTB-SAE-Standards.pdf on Apr. 6, 2018, 34 pages.

*Primary Examiner* — Hoi Lau
(74) *Attorney, Agent, or Firm* — James P. Muraff; Neal, Gerber & Eisenberg LLP

(57) ABSTRACT

Method and apparatus are disclosed for tracking hit and run perpetrators using V2X communication. An example host vehicle includes a first hardware module and a second hardware module. The first hardware module detects a collision with a target vehicle, and determines whether the collision is a hit-and-run event. The second hardware module collects identifying information of the target vehicle, and when the collision is the hit-and-run event, broadcasts a message including the identifying information and a cascade duration.

14 Claims, 7 Drawing Sheets

(56) References Cited

U.S. PATENT DOCUMENTS

| | | | | |
|---|---|---|---|---|
| 2009/0024274 A1* | 1/2009 | Nagai | ................... | G01D 9/005 |
| | | | | 701/33.4 |
| 2009/0299857 A1* | 12/2009 | Brubaker | ............... | G06Q 30/02 |
| | | | | 705/14.66 |
| 2012/0242511 A1* | 9/2012 | Morgan | ................. | B60R 25/04 |
| | | | | 340/989 |
| 2012/0286974 A1* | 11/2012 | Claussen | ............... | G08G 1/162 |
| | | | | 340/935 |
| 2014/0132404 A1* | 5/2014 | Katoh | ................... | B60R 21/013 |
| | | | | 340/436 |
| 2014/0218529 A1* | 8/2014 | Mahmoud | ............. | H04N 7/181 |
| | | | | 348/148 |
| 2014/0375807 A1* | 12/2014 | Muetzel | ................. | H04N 7/18 |
| | | | | 348/148 |
| 2015/0019447 A1* | 1/2015 | Baughman | ............. | G06Q 10/20 |
| | | | | 705/305 |
| 2015/0112504 A1* | 4/2015 | Binion | ................... | G07C 5/008 |
| | | | | 701/1 |
| 2015/0112543 A1* | 4/2015 | Binion | ................... | G07C 5/085 |
| | | | | 701/32.2 |
| 2015/0244994 A1* | 8/2015 | Jang | ................... | G06K 9/00825 |
| | | | | 348/148 |
| 2015/0310742 A1* | 10/2015 | Albornoz | ......... | G08G 1/096716 |
| | | | | 340/905 |
| 2017/0178513 A1* | 6/2017 | Davis | ..................... | G08G 1/162 |

FOREIGN PATENT DOCUMENTS

| | | | |
|---|---|---|---|
| KR | | 100763322 B1 | 10/2007 |
| WO | WO 2008093925 A1 | | 8/2008 |

* cited by examiner

US 10,089,869 B1

TRACKING HIT AND RUN PERPETRATORS USING V2X COMMUNICATION

TECHNICAL FIELD

The present disclosure generally relates to vehicle-to-everything (V2X) communication and, more specifically, tracking hit and run perpetrators using V2X communication.

BACKGROUND

The Dedicated Short Range Communication (DSRC) protocol is being developed as a part of the Intelligent Transportation System. The DSRC protocol will enable different forms of communications, such as vehicle-to-vehicle (V2V), vehicle-to-infrastructure (V2I), and vehicle-to-pedestrian (V2P) (collectively "V2X"). The aim of deploying the DSRC protocol is to reduce fatalities, injuries, property destruction, time lost in traffic, fuel consumption, exhaust gas exposure, among others. Increasingly, vehicles are being equipped to use the DSRC protocol.

"Hit and run" events occur when one driver strikes another vehicle, and drives away from the scene. These events are common, especially in urban areas where vehicles are often parked on the street. Hit and run events cause problems for the victims, the police, and insurance. The perpetrators of these offenses often go unpunished, as victims are unable to get the driver's identification before they speed away.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for tracking hit and run perpetrators using V2X communication. An example host vehicle includes a first hardware module and a second hardware module. The first hardware module detects a collision with a target vehicle, and determines whether the collision is a hit-and-run event. The second hardware module collects identifying information of the target vehicle, and when the collision is the hit-and-run event, broadcasts a message including the identifying information and a cascade duration.

An example method includes detecting, at a first vehicle, a hit-and-run event involving the first vehicle and a target vehicle. The example method also includes broadcasting, at the first vehicle, a message including identifying information of the target vehicle and a cascade duration. The example method includes, in response to receiving the message, determining, at a second vehicle, whether the target vehicle is in the vicinity of the second vehicle. Additionally, the example method includes, when the target vehicle is in the vicinity of the second vehicle, collect, at the second vehicle, tracking information of the target vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
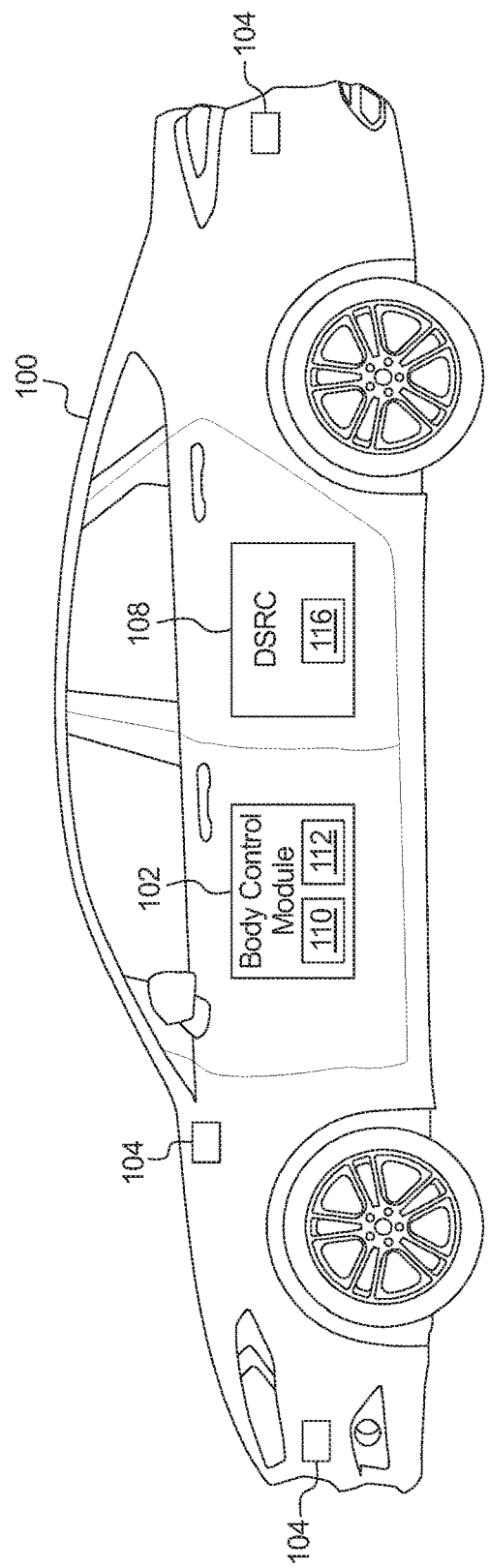
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A host vehicle equipped with a V2X communication module detects when a target vehicle (sometimes referred to as the "perpetrator") collides with the host vehicle and drives away (sometimes referred to as a "hit and run event"). In some examples, the V2X communication module is implemented using the Dedicated Short Range Communication (DSRC) protocol. When the host vehicle detects the hit and run event, the broadcasts a tracking message that includes identifying information (e.g., license plate, vehicle identification number, VIN, make and model, color, etc.) of the target vehicle. The tracking messages starts a cascade of tracking information as recipients detect the target vehicle, add tracking information, and rebroadcast the tracking message. The tracking message also includes a cascade duration. The cascade duration specifies a number of times the target message is to be rebroadcast.

Upon the reception of the tracking message, other vehicles (sometimes referred to as "bystander vehicles") and/or roadside units (e.g., V2X-enabled charging stations, V2X-enabled cameras, V2X-enabled traffic signals, etc.) (a) determine whether the target vehicle is in the vicinity, (b) when the target vehicle is within the vicinity, capture information (e.g., images, a license plate number, location, speed, trajectory, etc.) about the target vehicle, and (c) rebroadcast the targeting message. The bystander vehicles and/or the roadside units append the captured information and/or coordinates to the target message. The captured information includes V2X messages transmitted by the target vehicle (e.g., safety messages, etc.), images captured by cameras, and/or measurements by sensors (e.g., RADAR, LiDAR, ultrasonic sensors, etc.), etc. In such a manner, as the target message cascades, the target vehicle is be tracked. The tracking messages are collected by authorities (e.g., police, etc.). The tracking information in the tracking messages is compiled and analyzed to identify the target vehicle.

FIG. 1 illustrates a host vehicle 100 operating in accordance with the teachings of this disclosure. The host vehicle 100 may be a standard gasoline powered vehicle, a hybrid vehicle, an electric vehicle, a fuel cell vehicle, and/or any other mobility implement type of vehicle. The host vehicle 100 includes parts related to mobility, such as a powertrain with an engine, a transmission, a suspension, a driveshaft, and/or wheels, etc. The host vehicle 100 may be non-autonomous, semi-autonomous (e.g., some routine motive functions controlled by the host vehicle 100), or autonomous (e.g., motive functions are controlled by the host vehicle 100 without direct driver input). In the illustrated example the host vehicle 100 includes a body control module 102, one or more cameras 104, sensors 106, and a V2X module 108.

The body control module 102 controls various subsystems of the host vehicle 100. For example, the body control module 102 may control power windows, power locks, an immobilizer system, and/or power mirrors, etc. The body control module 102 includes processors and/or circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 102 includes a collision sensor 110 and a hit-and-run (HR) detector 112. The collision sensor 110 detects when the host vehicle 100 is impacted by a force indicative of a collision (e.g., a combination of sudden lateral, front and/or rear forces) with another vehicle (e.g., a target vehicle 114). In some examples, the collision sensor 110 includes an accelerometer. Alternatively or additionally, in some examples, the collision sensor 110 analyzes data from the cameras 104 and/or the sensors 106 to determine when the target vehicle 114 collides with the host vehicle 100. For example, the collision sensor 110 may use image recognition and/or LiDAR/RADAR measurements to determine when the body of the target vehicle 114 collides with the body of the host vehicle 100.

The HR detector 112 classifies whether the collision is a hit-and-run event after a collision is detected. When a collision is detected, the HR detector 112 collects information about the target vehicle 114 from the cameras 104, the sensors 106, and/or the V2X module 108. For example, the cameras 104 may capture images to identify the vehicle (e.g., via image recognition to detect make, model, and color, license plate recognition to capture the license plate, etc.), the sensors 106 may determine the trajectory of the target vehicle 114, and the V2X module 108 may collect information broadcast by a V2X module of the target vehicle 114 (e.g., via a safety message, etc.). Additionally, the HR detector 112 starts a timer. The timer is used to determine if any of the target vehicle 114 begins to drive away from the scene before a minimum time (e.g., five minutes, ten minutes, etc.) has expired. When a collision is detected and the target vehicle 114 drives away before a threshold period of time, the HR detector 112 classifies the collision as a hit-and-run event. More examples of the operation of the HR detector 112 are described in U.S. application Ser. No. 15/598,378 entitled "Hit-and-Run Detection," filed May 18, 2017, which is herein incorporated by reference in its entirety.

The camera 104 captures images, in response to a hit-and-run event, to be analyzed to determine identifying information of the target vehicle 114. In some examples, the camera 104 includes an image processor that performs (a) image recognition to determine the make, model, and/or color of the target vehicle 114 in conjunction with on on-board or remote database and/or (b) license plate recognition. The camera(s) 104 is/are a forward-facing camera, a rear-facing camera, and/or a 360-degree-view camera, etc.

The sensors 106 may be arranged in and around the host vehicle 100 in any suitable fashion. The sensors 106 may mounted to measure properties around the exterior of the host vehicle 100. Additionally, some sensors 106 may be mounted inside the cabin of the host vehicle 100 or in the body of the host vehicle 100 (such as, the engine compartment, the wheel wells, etc.) to measure properties in the interior of the host vehicle 100. For example, such sensors 106 may include accelerometers, odometers, tachometers, pitch and yaw sensors, wheel speed sensors, microphones, tire pressure sensors, and biometric sensors, etc. In the illustrated example, the sensors 106 include range detection sensors. The range detection sensors are sensors that detect and measure objects (such as the target vehicle 114) in the vicinity of the host vehicle 100. The sensors 106 may include, for example, RADAR, LiDAR, ultrasonic sensors, and/or infrared sensors, etc.

The example V2X module 108 include antenna(s), radio(s) and software to broadcast messages and to establish connections between the vehicles 100 and 114, infrastructure-based modules (not shown), and mobile device-based modules (not shown). In some examples, the V2X module 108 is implemented with the Dedicated Short Range Communication (DSRC) protocol. More information on the DSRC network and how the network may communicate with vehicle hardware and software is available in the U.S. Department of Transportation's Core June 2011 System Requirements Specification (SyRS) report (available at http://www its.dot.gov/meetings/pdf/CoreSystem_ SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

In some examples, when a collision is detected, the V2X module 108 broadcasts a collision message that includes identifying information (e.g., a vehicle identification number (VIN), a license plate number, etc.) and a location (e.g., coordinates from a global positioning system (GPS) receiver) of the vehicle (such as the host vehicle 100 and/or the target vehicle 114).

In the illustrated example, the V2X module 108 includes a target tracker 116. The target tracker 116 sends a target message when the HR detector 112 detects a hit-and-run event. The tracker message includes (a) identifying information of the host vehicle 100, (b) identifying information about the target vehicle 114 and (c) a cascade duration. The identifying information is captured by the cameras 104, the sensors 106, and/or the V2X module 108 (e.g., via collision messages and/or safety messages broadcast by the target vehicle 114). For example, the target message may include the license plate of the target vehicle 114. The cascade duration is set so that the message propagates to bystander vehicles (e.g., the bystander vehicles 200 of FIG. 2 below) and/or road side units (e.g., the road side units 202 of FIG. 2 below) in an area that encompasses the expected locations of the target vehicle 114. In some examples, the cascade duration is a predefined value (e.g., three, five, etc).

When a bystander vehicle or roadside unit receives the target message (e.g., via its own V2X module 108 that includes the target tracker 116), the bystander vehicle or roadside unit determines whether the target vehicle 114 is within its vicinity. In some examples, the bystander vehicle or roadside unit detects broadcasts (e.g., safety messages) from the V2X module of the target vehicle 114. Alternatively or additionally, the bystander vehicle or roadside unit detects (e.g., via one or more cameras) the target vehicle 114 using the identifying information (e.g., license plate number, make, model, color, etc.) included in the target message. When the target vehicle is not detected and when the cascade duration is greater than zero, the bystander vehicle or roadside unit (i) decrements the cascade duration and (ii) broadcasts the target message. When the target vehicle 114 is detected, the bystander vehicle or roadside unit captures identifying information of the target vehicle 114. The captured information includes images, safety message data, and/or trajectory data (e.g., measured by sensors of the bystander vehicle or roadside unit.), etc. For example, the bystander vehicle or roadside unit may capture an image of the target vehicle 114 and determine the speed and direction (e.g., the trajectory) of the target vehicle 114 using its LiDAR. Additionally, the bystander vehicle or roadside unit determines its coordinates where the target vehicle 114 is spotted. The bystander vehicle or roadside unit then (i) appends the identifying information and the coordinates of the bystander vehicle or roadside unit to the target message, (ii) sets the cascade duration to its original value, and (iii) broadcasts the target message. In such a manner, the target message continues to cascade in the vicinity of the target vehicle 114. Additional examples of causing V2X messages to propagate (e.g., cascade) through V2X-enabled vehicles and road side units are described in International Application No. PCT/US2016/062893, entitled "Method and Apparatus to Enable Vehicle-to-Vehicle Guidance and Tracking," filed Nov. 18, 2016, which is herein incorporated by reference in its entirety.

Figure 2A:
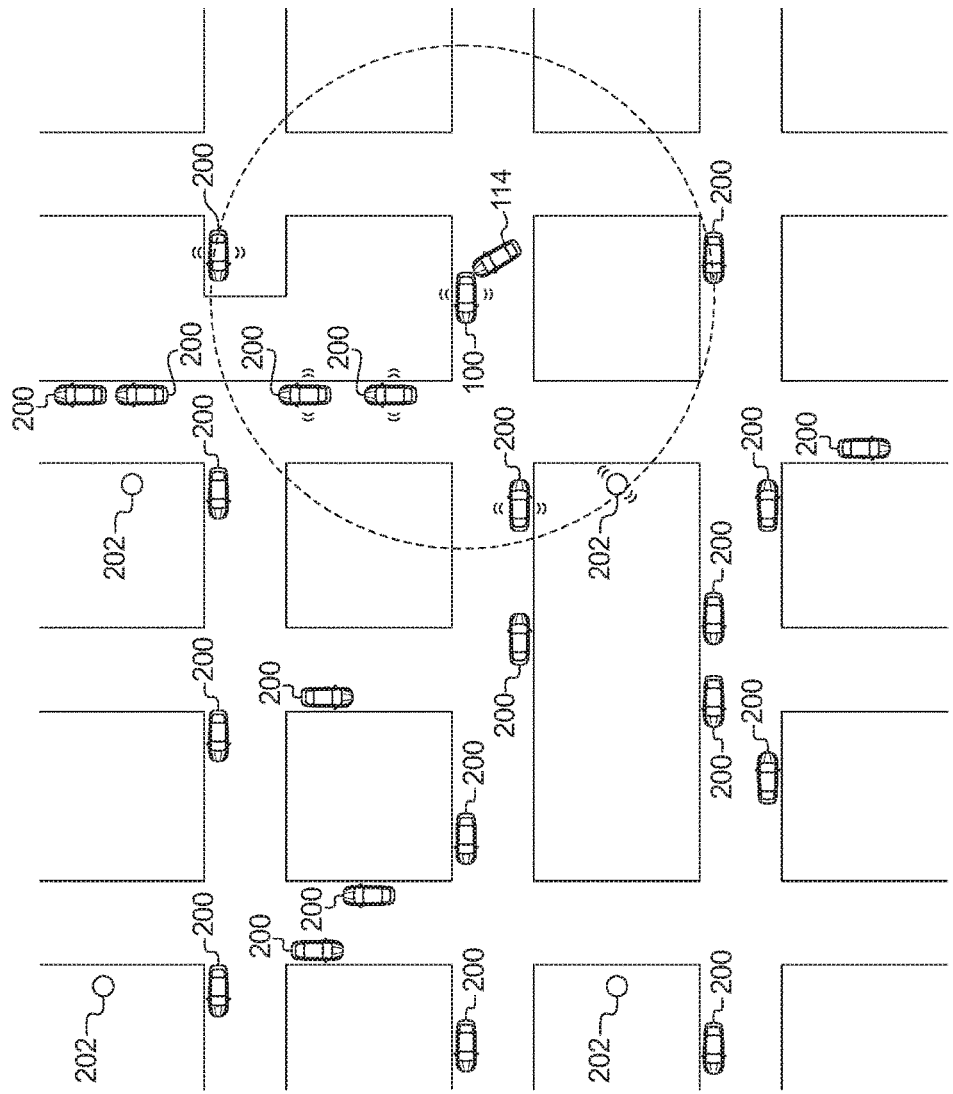
FIGS. 2A, 2B, and 2C illustrate tracking messages propagating after a hit and run event.
Figure 2B:
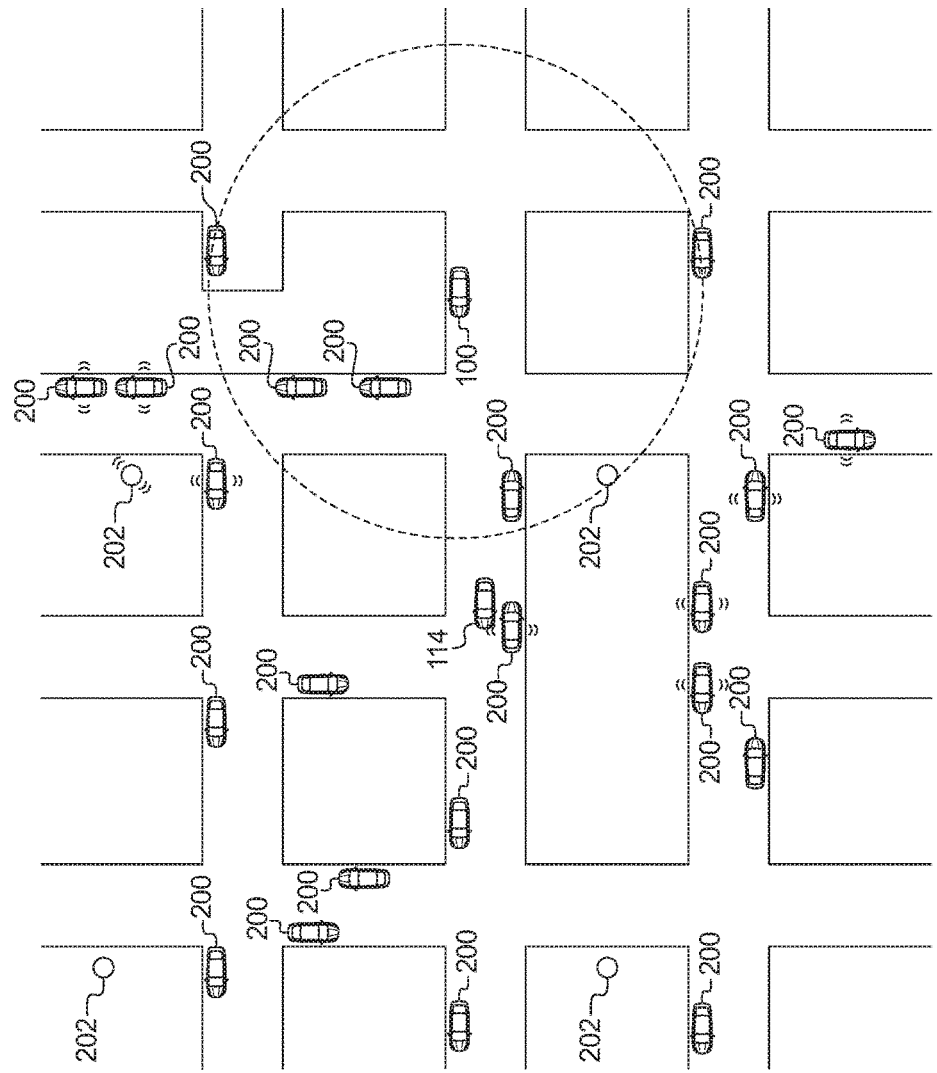
Figure 2C:
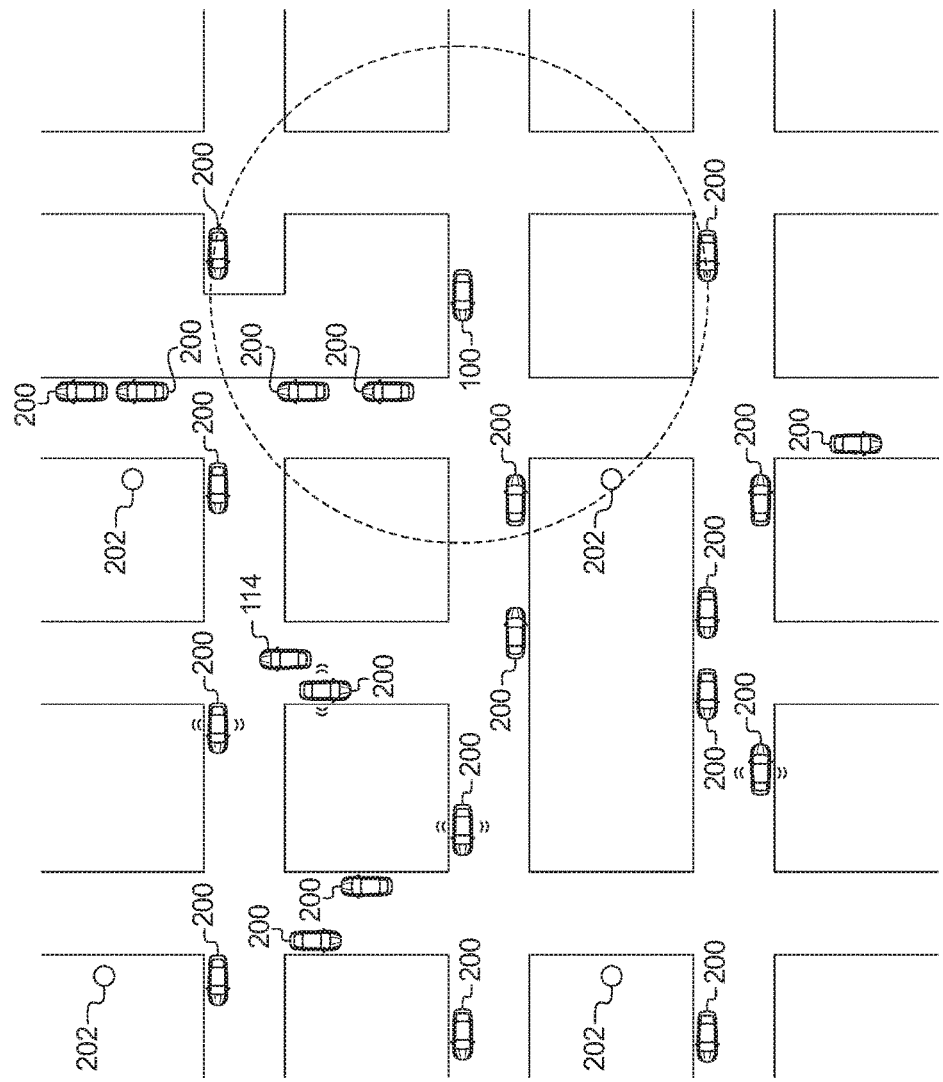

FIGS. 2A, 2B, and 2C illustrate tracking messages propagating after a hit and run event. The illustrated examples include bystander vehicles 200, road side units 202, the host vehicle 100, and the target vehicle 114. Additionally, the illustrated examples include a marker 206 illustrating the range of the V2X module 108 of the host vehicle 100. FIG. 2A illustrates a first time when the target vehicle 114 (a) collides with the host vehicle 100 and (b) drives away. As discussed above, the HR detector 112 of the host vehicle 100 classifies the collision as a hit-and-run event. Subsequently, the host vehicle, via the V2X module 108, broadcasts a target message with identifying information of the target vehicle 114 with a cascade duration. The bystander vehicles 200 and/or the road side units 202 within range of the host vehicle 100 receive the target message.

FIGS. 2B and 2C illustrate a second time and a third time. The bystander vehicles 200 and/or the road side units 202 that received the target message determine whether the target vehicle 114 is detected. Then the target vehicle 114 is detected the bystander vehicles 200 and/or the road side units 202 that detected it gather identifying information, append the identifying information to the target message, and rebroadcast the target message. Because the bystander vehicles 200 and/or the road side units 202 that detect the target vehicle 114 reset the cascade duration, the target message continues to be rebroadcast in the vicinity of the target vehicle 114 while in areas distant from the target vehicle 114, the target messages eventually are not rebroadcast and end.

Figure 3:
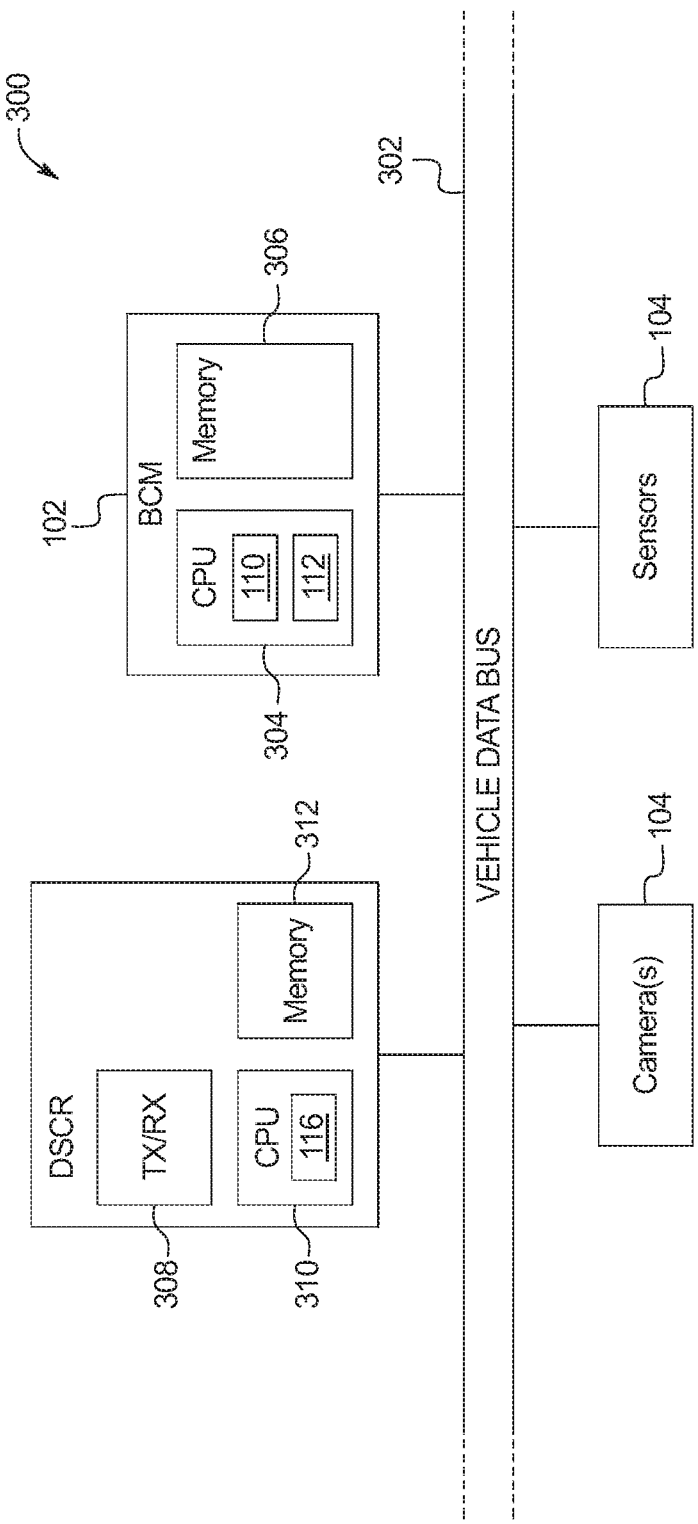
FIG. 3 is a block diagram of electronic components of the vehicle of FIG. 1.

FIG. 3 is a block diagram of electronic components 300 of the host vehicle 100 of FIG. 1. In the illustrated example, the electronic components 300 include the body control module 102, the camera(s) 106, the sensors 106, the V2X module 108, and a vehicle data bus 302.

The body control module 102 a processor or controller 304 and memory 306. In the illustrated example, the body control module 102 is structured to include HR detector 112. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory YYY may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory YYY includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The V2X module 108 includes transmission/reception circuitry 308, a processor or controller 310 and memory 312. In the illustrated example, the V2X module 108 is structured to include the target tracker 116. The processor or controller 310 may be any suitable processing device or set of processing devices such as, but not limited to: a microprocessor, a microcontroller-based platform, a suitable integrated circuit, one or more FPGAs, and/or one or more ASICs. The memory 312 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 312, the computer readable medium, and/or within the processor 310 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the body control module 102, the camera(s) 106, the sensors 106, and the V2X module 108. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
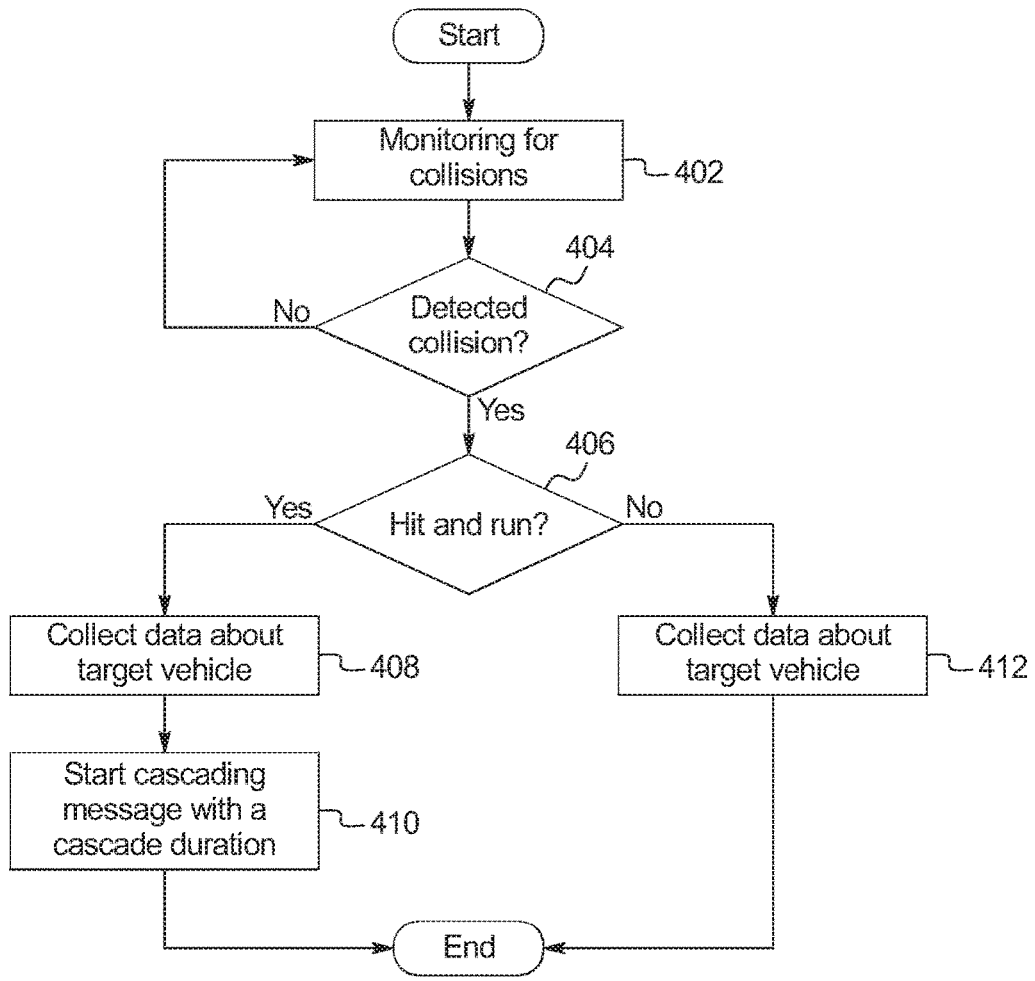
FIG. 4 is a flowchart of method to respond to detecting the hit and run event, which may be implemented by the electronic components of FIG. 3.

FIG. 4 is a flowchart of method for the host vehicle 100 to respond to detecting the hit and run event, which may be implemented by the electronic components 300 of FIG. 3. Initially, the HR detector 112 of the host vehicle 100 monitors for a collision (block 402). When a collision is detected, the method continues at block 406 (block 404). Otherwise, when the collision is not detected, the method returns to block 402 (block 404). The HR detector 112 determines whether to classify the collision as a hit-and-run event (block 406). In some examples, when the collision is detected, the HR detector 112 starts a timer. In such example, the HR detector 112 classifies the collision as a hit-and-run event when the target vehicle 114 leaves before a threshold period of time. When the collision is a hit-and-run event, the method continues to block 408. Otherwise, when the collision is not a hit-and-run event, the method continues to block 412.

When the collision is a hit-and-run event, the target tracker 116 of the host vehicle 100 collects identifying information about the target vehicle 114. (block 410). The identifying information may include, for example, make and model, color, license plate number, VIN, and/or V2X identifier, etc. The target tracker 116 then broadcasts the target message with the identifying information of the target vehicle 114 and a cascade duration (block 410). When the collision is not a hit-and-run event, the target tracker 116 of the host vehicle 100 collects identifying information about the target vehicle 114. (block 412).

Figure 5:
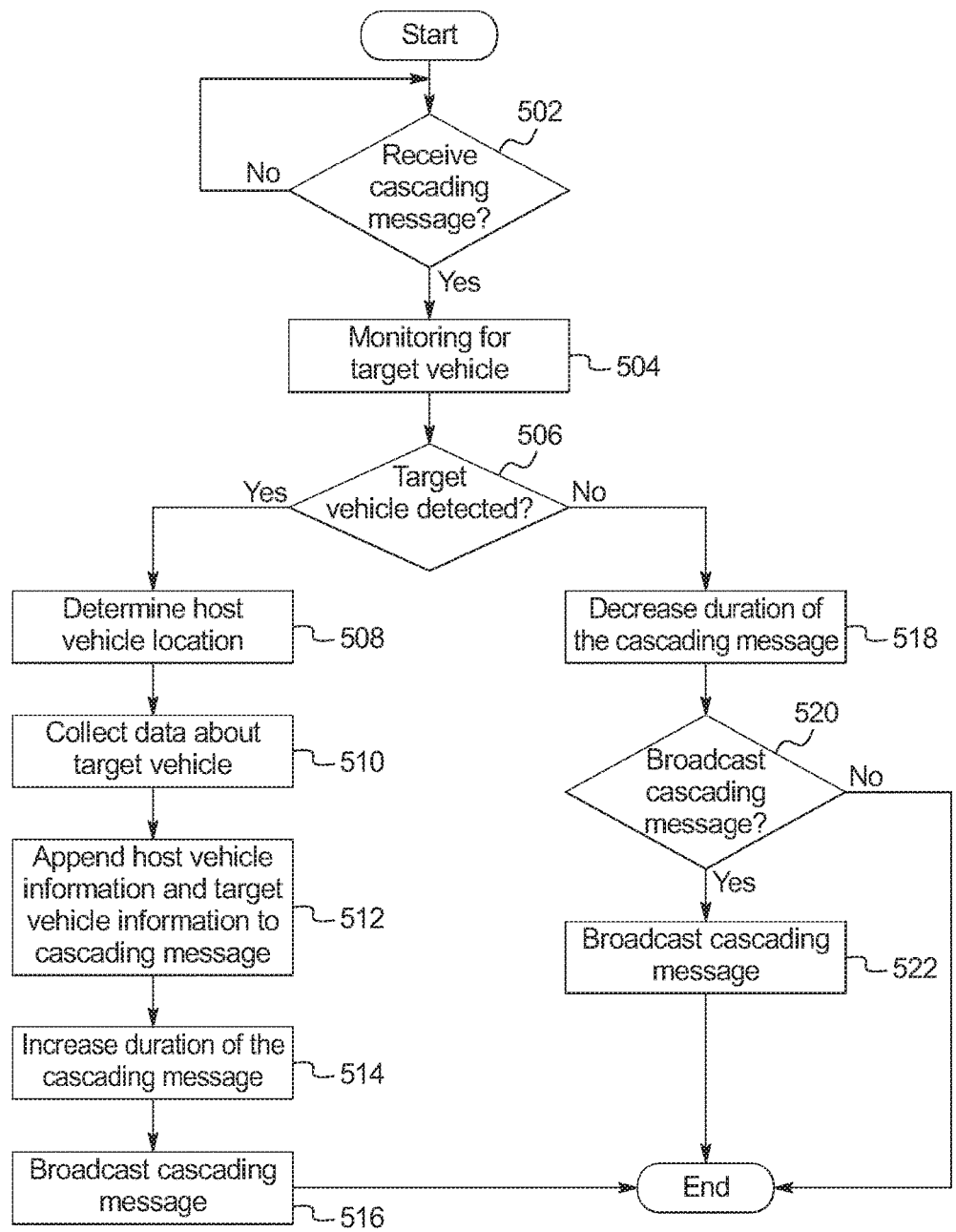
FIG. 5 is a flowchart of a method to response to receiving a tracking message, which may be implemented by the electronic components of FIG. 3.

FIG. 5 is a flowchart of a method for a bystander vehicle 200 or a road side unit 202 to response to receiving a tracking message, which may be implemented by the electronic components 300 of FIG. 3. Initially, the target tracker 116 of the bystander vehicle 200 or the road side unit 202 waits until a target message is received (block 502). The target tracker 116 monitors, via the cameras 104, the sensor 106, and/or the V2X module 108, the vicinity around the bystander vehicle 200 or the road side unit 202 (block 504). The target tracker 116 determines whether the target vehicle 114 is detected (block 506). When the target vehicle 114 is detected, the method continues at block 508. Otherwise, when the target vehicle 114 is not detected, the method continues at block 518.

When the target vehicle 114 is detected, the target tracker 116 determines the location of the bystander vehicle 200 or the road side unit 202 (block 508). The target tracker 116 collects tracking data about the target vehicle 114. (block 510). The tracking data may include, for example, one or more images, license plate number, and/or trajectory of the target vehicle 114, etc. The target tracker appends the location of the bystander vehicle 200 or the road side unit 202 and the tracking data to the target message (block 512). The target tracker 116 increases the cascade duration (block 514). In some examples, the target tracker 116 resets the cascade duration to its original values. For example, if the host vehicle original sets the cascade duration to three, the target tracker 116 of the bystander vehicle 200 or the road side unit 202 may reset the cascade duration to three. The target tracker 116 then broadcasts the appended target message (block 516).

When the target vehicle 114 is not detected, the target tracker 116 decrements the cascade duration of the target message (block 518). The target tracker 116 determines whether to broadcast the target message (block 520). The target tracker 116 determines to broadcast the tracker message when the cascade duration is greater than zero. When the tracker message is to be broadcast, the method continues to block 522. Otherwise, when the tracker message is not to be broadcast, the method ends. When the tracker message is to be broadcast, the target tracker 116 sets the cascade duration of the tracker message to the value calculated at block 518 and broadcasts the tracker message.

The flowcharts of FIGS. 4 and 5 are representative of machine readable instructions stored in memory (such as the memory 306 and/or the memory 312 of FIG. 3) that comprise one or more programs that, when executed by a processor (such as the processor 304 and/or the processor 310 of FIG. 3), cause the host vehicle 100, the bystander vehicle 200, and/or the road side unit 202 to implement the example HR detector 112 and/or the example target tracker 116 of FIGS. 1 and 3. Further, although the example program(s) is/are described with reference to the flowcharts illustrated in FIGS. 4 and 5, many other methods of implementing the example HR detector 112 and/or the example target tracker 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A host vehicle comprising:
   a first hardware module to:
   detect a collision with a target vehicle; and
   determine whether the collision is a hit-and-run event; and
   a second hardware module to:
   collect identifying information of the target vehicle; and
   when the collision is the hit-and-run event, broadcast to other vehicles within range a message including the identifying information and a cascade duration specifying a number of times the message is to be rebroadcast.

2. The host vehicle of claim 1, wherein to determine whether the collision is the hit-and-run event, the first hardware module is to:
   in response to detecting the collision, set a timer to track an amount of time;
   monitor a location of the target vehicle; and
   when the target vehicle is a threshold distance away from the host vehicle before the amount of time reaches a threshold amount of time, determine that the collision is the hit-and-run event.

3. The host vehicle of claim 2, wherein to monitor the location of the target vehicle, the first hardware module is to determine the location of the target vehicle based on messages broadcast by the target vehicle.

4. The host vehicle of claim 2, wherein to monitor the location of the target vehicle, the first hardware module is to determine the location of the target vehicle based measurements of sensors of the host vehicle.

5. The host vehicle of claim 1, wherein to collect the identifying information of the target vehicle, the second hardware module is to collect the identifying information based on messages broadcast by the target vehicle.

6. The host vehicle of claim 1, wherein to collect the identifying information of the target vehicle, the second hardware module is to determine a license plate number of the target vehicle based on license plate recognition.

7. The host vehicle of claim 1, wherein to collect the identifying information of the target vehicle, the second hardware module is to determine a make, model and color of the target vehicle based on image recognition.

8. A method comprising:
   detecting, at a first vehicle, a hit-and-run event involving the first vehicle and a target vehicle;
   broadcasting, at the first vehicle, a message including identifying information of the target vehicle and a cascade duration;
   in response to receiving the message, determining, at a second vehicle, whether the target vehicle is in a vicinity of the second vehicle;
   when the target vehicle is in the vicinity of the second vehicle, collect, at the second vehicle, tracking information of the target vehicle.

9. The method of claim 8, including detecting, at the first vehicle, a collision with the target vehicle.

10. The method of claim 9, including:
    in response to detecting the collision, setting a timer;
    monitoring a location of the target vehicle; and
    when the target vehicle is a threshold distance away from the first vehicle before a threshold amount of time, determining that the collision is the hit-and-run event.

11. The method of claim 8, including, when the target vehicle is in the vicinity of the second vehicle, at the second vehicle:
    determining whether the cascade duration is greater than a threshold; and
    when the cascade duration is greater than the threshold, decrementing the cascade duration, and broadcasting the message.

12. The method of claim 8, including, when the target vehicle is in the vicinity of the second vehicle, at the second vehicle:
    increasing the cascade duration;
    appending the tracking information and a location of the second vehicle to the message; and
    broadcasting the message.

13. The method of claim 8, wherein the tracking information includes at least one of an image of the target vehicle, coordinates of the target vehicle obtained from a safety message broadcast by the target vehicle, and a trajectory of the target vehicle.

14. The method of claim 8, wherein determining whether the target vehicle is in the vicinity of the second vehicle includes comparing a first license plate number in the identifying information of the message to a second license plate number obtained by a camera of the second vehicle.

* * * * *